Oct. 31, 1961  J. LIMIDO ET AL  3,006,844
CATALYTIC HYDROGENATION OF HYDROCARBONS IN THE LIQUID PHASE
Filed Feb. 14, 1958
FLOW SHEET
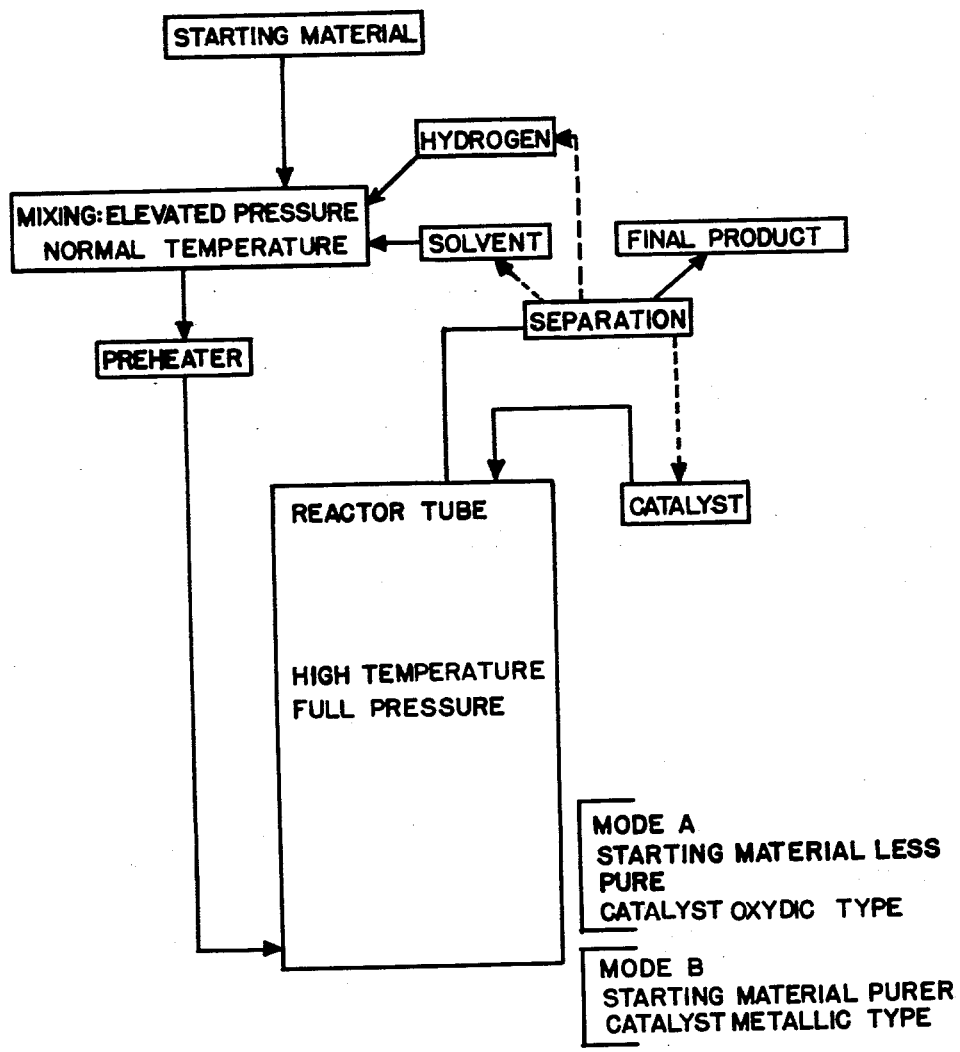
INVENTORS
JEAN LIMIDO, JEAN MIQUEL,
CLÉMENT THONON
BY Joulmin & Joulmin
ATTORNEYS United States Patent Office 3,006,844
Patented Oct. 31, 1961

3,006,844
CATALYTIC HYDROGENATION OF HYDROCARBONS IN THE LIQUID PHASE
Jean Limido and Jean Miquel, Paris, and Clement Thonon, Rueil-Malmaison, France, assignors to Institut Francais du Petrole des Carburants et Lubrifiants, Paris, France
Filed Feb. 14, 1958, Ser. No. 715,402
Claims priority, application France Feb. 15, 1957
9 Claims. (Cl. 208—216)

This invention relates to a process for the catalytic purification and saturation, by hydrogenation, of certain hydrocarbon materials comprising unsaturated light hydrocarbons and light hydrocarbon fractions having an average molecular weight corresponding to hydrocarbons which contain from 2 to 14 and more carbon atoms per molecule (molecular weight from 25 to 200).

It is an object of our invention to provide a process for the purification and/or saturation, by catalytic treatment with hydrogen, of hydrocarbon materials of the aforesaid type in the liquid phase and at mild temperature conditions.

The hydrocarbon materials of the aforesaid type which may be treated by the process of the invention, comprise unsaturated aliphatic as well as cyclic hydrocarbons and hydrocarbonaceous fractions containing the same, and are hereinafter referred to as "hydrocarbon materials" for the sake of brevity.

The hydrocarbon fractions of the above described type frequently contain impurities among which there are primarily undesirable high contents of sulfur, nitrogen and oxygen. Processes are known for the removal of these impurities by the catalytic hydrogenation of these impurities selectively, i.e., without substantial hydrogenation of unsaturated bonds between carbon atoms in the hydrocarbons. These processes are known as hydrogen-refinement. Catalytic hydrogenation with certain other types of catalysts leads to the partial or total saturation of the unsaturated components of these hydrocarbons.

Hydrogen-refinement of the aforesaid hydrocarbons may be expressed by the following equations illustrating the removal of sulfur-, nitrogen-, and oxygen contents therefrom:

(1) Hydrogen desulfuration

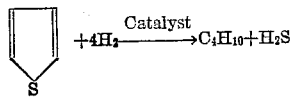

(2) Hydrogen decomposition of nitrogen-containing derivatives

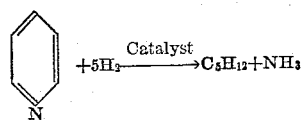

(3) Hydrogen decomposition of oxygen-containing derivatives

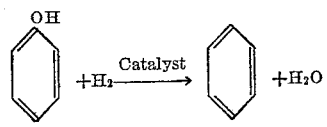

While a certain group of known catalysts is required for the aforesaid selective purification of the hydrocarbons, catalytic hydrogenation with certain other known catalysts will lead to the partial or total saturation of unsaturated bonds in these hydrocarbons.

All of these catalytic processes known in the art, be it for the purification of the hydrocarbons of the type described by a selective hydrogenation of their impurities, or for the saturation of these hydrocarbons by catalytic hydrogenation, must be carried out in the vapor or gaseous phase and suffer from a number of drawbacks due to this latter fact, among which are:

(a) A spatial reaction velocity which is relatively slow, i.e., for instance in the order of one volume part of treated liquid material for every volume part of catalyst and per hour, in the case of hydrosulfuration of light petroleum fractions containing from 0.1 to 0.2% of sulfur as impurities;

(b) The necessity of recycling considerable amounts of the gaseous hydrogen required in the process (in the order of 250 to 1000 liters) at normal temperature and pressure for every liter of treated hydrocarbon material; and (c) The formation of products of higher molecular weight which tend to quickly deactivate the catalyst. This undesirable effect is particularly pronounced in the hydrogen refinement of crude benzene obtained from coal distillation, which benzene often contains higher amounts of sulfur, nitrogen and oxygen as well as easily polymerizable substances such as cyclopentadiene, indene, cumarone and the like. The known processes for the hydrogen refinement of crude benzene thus lead to the formation of resins which accumulate on the catalyst and form incrustations on the walls of the reactor, thereby causing frequent halts in the operation of the plant in order to clean the reactors and renew the catalyst.

Particularly in the case of treating benzene, the sulfur and nitrogen contained in the same deactivate the catalysts used for the process, and in particular platinum catalysts.

The presently known art attempts to avoid these drawbacks by preceding the hydrogenation treatment by a polymerization step carried out in the liquid phase, in order to remove the polymerizable substances contained in the hydrocarbon being treated. The hydrogenation treatment is then carried out in the conventional manner in the gaseous phase, with the hydrocarbon material freed from polymerizable substances. This solution of the problem now adopted in the art requires a special polymerization apparatus and is correspondingly complicated and expensive.

The art has hitherto avoided or not been able to use hydrogenation of light, and particularly unsaturated light hydrocarbons in the liquid phase, due to the fact that excessively high pressures would be required for maintaining the treated hydrocarbon material in the liquid phase, and for adding thereto hydrogen under a sufficiently high partial pressure, at the temperatures required for an effective hydrogenation. These pressures would far exceed those necessary for a liquid phase operation in the presence of a solvent. In fact, in the case of light hydrocarbons having four or less hydrocarbons per molecule, working in the liquid phase would be made impossible anyhow, due to the fact that the temperatures required for hydrogenation are above the critical temperatures of these hydrocarbons.

In order to overcome these drawbacks of the known processes and attain the object stated hereinbefore, the process according to our invention provides for the hydrogen refinement and/or partial or total saturation of the hydrocarbon material to be treated, either by means of a selective catalytic hydrogenation of the impurities contained in the hydrocarbon material, or by hydrogenation of the unsaturated portions of the latter, in the liquid phase, instead of the gaseous phase as in the known processes, and under moderate pressures as compared with the pressures required for a vapor phase operation leading to similar results. The liquid phase contains the hydrocarbon material under treatment dissolved in an organic hydrocarbonaceous liquid which remains inert, at the temperatures and pressures of the process according to the invention, with regard to the hydrocarbon material under treatment, and which solvents have a boiling point, under normal pressure, higher than about 80° C.

The use of a solvent for the hydrocarbon material, which solvent has the above-enumerated characteristics, has the effect of reducing the vapor pressure of the hydrocarbon material and thus permits to operate at the temperatures required for hydrogenation at much lower pressures, and in practice below 100 atmospheres, as against the much higher pressures required when working with the free, undissolved hydrocarbon material, which latter pressures were mostly found to be excessive for industrial operation on an economical basis. Suitable solvents will be enumerated hereinafter.

According to another important feature of our invention, the process for catalytic hydrogenation can be steered toward (A) selective hydrogen refinement of the hydrocarbon material by exclusively hydrogenating the sulfur-, oxygen-, and nitrogen containing substances and similar impurities in the hydrocarbon material, by selecting a suitable catalyst which is resistant to the action of the aforesaid impurities and remains active during the refinement step, and (B) toward saturation, partial or total, of the unsaturated hydrocarbon fraction contained in the hydrocarbon material to be treated, by selecting a suitable catalyst for this second purpose, which catalyst may be chosen among those which are usually more sensitive to the aforesaid impurities than the catalysts employed under (A).

In fact, impurities such as sulfur, nitrogen or oxygen, if present in the hydrocarbon material in the original quantities would quickly deactivate most or all of the known catalysts suitable for the partial or total saturation of the unsaturated hydrocarbons in the material treated according to mode B. Therefore, the sulfur content, for instance, of this material must be previously reduced to below 0.01% and often below 0.001%, if a reasonably long lifetime of the catalysts suitable for mode B is to be assured. The nitrogen content can be reduced effectively to below 1 part per one million parts of hydrocarbon.

On account of the last-mentioned characteristics of the catalysts required for mode B of operating the process according to our invention, we propose to apply the latter mode of operation only to such hydrocarbon materials which contain relatively few of the catalyst deactivating impurities, and therefore, generally to the end products of mode A of the process according to the invention. The preferred mode of carrying out the process according to the invention would, therefore, comprise the steps illustrated in the accompanying flowsheet of:

(A) First refining the crude, unsaturated hydrocarbon material by (1) dissolving the same in a suitable solvent of the type mentioned above, and to be described in detail hereinafter, and (2) hydrogenating the impurities contained in the hydrocarbon material selectively with the aid of a catalyst substantially resistant to deactivation by these impurities, and carrying out this first step at relatively high pressures and temperatures and thereafter (B) Subjecting the final, purified product from step A to a saturation by hydrogenation also in the liquid phase by dissolving the purified product in a solvent of the same or a similar type as was used in step A, and with the aid of a more strongly active, and more sensitive catalyst, while carrying out this step at pressures and temperatures which are about half as high as those applied during the first step A. It is thus possible to obtain by operation entirely in the liquid phase, a completely saturated product while substantially avoiding any deactivation of the catalysts employed.

In order to carry out the process of our invention in practice, the hydrocarbon material to be treated is mixed with a suitable solvent either before or after introduction into the reactor. The hydrocarbon material should have an average molecular weight below 200.

The solvent to be used must in any case have a critical temperature higher than the reaction temperature applied. Thus the solvent used in mode A must have a critical temperature always higher than 250° C. and in some cases higher than 500° C. (upper temperature limit in mode A) while it is never necessary though in some cases more convenient in mode B to use solvents having a critical temperature substantially higher than 250° C.

Suitable solvents for use in mode A as well as in mode B of operating the process according to the invention are, subject to fulfilling the above-mentioned conditions of a sufficiently high boiling point and critical point and inert behavior during the hydrogenation treatments, paraffinic straight chain or branched hydrocarbons having at least 7 carbon atoms per molecule, and a boiling point of at least 98.5° C. Cycloparaffins having at least 7 carbon atoms per molecule and boiling points of 100.9° C. and higher are also suitable, and so are, more particular for mode A, aromatic hydrocarbons having at least 6 carbon atoms and a boiling point of 80.1° C. and higher. The maximum of carbon atoms per molecule of these solvents depends on the melting point thereof, and on the temperature at which the admixture of the hydrocarbon material to the solvent is to be carried out. Thus, if the latter step is to take place at room temperatures, the number of carbon atoms should not exceed 17 in a straight-chain paraffinic solvent, while it might be higher in a ramified one. These paraffinic solvent hydrocarbons may be used singly or in mixture when used as the solvent in the present process. Thus, normal cetane $C_{16}H_{34}$ has been used as a singly, paraffinic hydrocarbon, and paraffin oil, in particular obtained in a known manner from petroleum, has been used as an example of a mixed at least partly paraffinic solvent.

Where the reaction temperature attains 500° C., solvents that can be used due to their critical temperature being above 500° C., are paraffins having at least 20 carbon atoms per molecule and boiling points of at least 342.7°, or aromatic hydrocarbons having at least 17 carbon atoms per molecule and boiling points above 310° C.

Other substances suitable as solvents for the purpose of the invention are, subject to the aforesaid conditions, the fully saturated hydrogenation products of naphthenic hydrocarbons, such as alkyl decahydronaphthalenes, alkyl cyclohexanes, dicyclohexyl, and similar saturated cyclic organic compounds. Di-cyclohexyl and dodecyl cyclohexane have been used for the purpose of the invention and are characteristic of this group of suitable solvents.

Furthermore, unsaturated hydrocarbons, in particular of the aromatic type, such as alkyl benzenes, alkyl naphthalenes, dibenzyl, diphenyl, alkyl diphenyls and similar compounds can be used as solvents, in particular for mode A of carrying out the process of the invention.

Mode B should preferably be carried out with saturated solvents to reduce hydrogen consumption.

In the case of this mode of operation any solvent having a critical temperature of 250° C. and higher such as paraffins of 7 carbon atoms and more or aromatics of 6 carbon atoms or more is always convenient.

Finally, hydrocarbon fractions obtained by fractioned distillation of petroleum such as gas oil, lubricating oil and the like and hydrocarbon materials constituting paraffinic concentrates obtained by treatment with urea, phenol or furfural, oil fractions obtained by the distillation of coal tar, wash oils and the like, may also be used as solvents for the purpose of this invention.

The treatments with urea, phenol or furfural are described by V. A. Kalichevsky and K. A. Kobe in "Petroleum Refining with Chemicals," pages 347, 350 and 430, published by Elsevier Publishing Company, New York.

The hydrocarbon material to be treated is mixed with the solvent in a ratio which depends largely on the type of the former. Generally speaking, a minimum quantity of solvent is to be used for economical reasons, which minimum quantity must be sufficient to maintain the total amount of hydrocarbon material to be treated completely dissolved in the liquid phase, throughout the hydrogenation step.

In most cases the above minimum quantity of 20 parts by weight of solvent will be required for every 100 parts by weight of hydrocarbon material under treatment.

In order to avoid uneconomical cycling of large amounts of solvent in the process, not more than 80 parts by weight of solvent for every 100 parts by weight of the hydrocarbon material should be required.

The mixture of solvent and hydrocarbon material is then hydrogenated with the aid of a catalyst, which is present in the reactor as a stationary or mobile layer and in granulated or powder form. The catalyst may also be suspended in the reaction medium. The solvent must have a lower adsorption coefficient with regard to the catalyst than does the treated hydrocarbon material. The ratio of the adsorption coefficient of the solvent mixture to the reactants one is lower than 1/30 according to mode A and lower than 1/5000 according to mode B.

When the catalyst is to be used as a mild hydrogenator in mode A of the process of the invention, it must be resistant to the action of the impurities contained in the treated materials. Thus, where desulfurization by hydrogenation of S-containing impurities is required, it is recommended to select a sulfur-resisting and preferably oxygen- or sulfur-containing catalyst, such as in particular, the oxides and sulfides of the metals of the groups VI and VIII of the periodic table according to Mendelyeev. For instance, chromium oxide, cobalt molybdate, cobalt oxide, nickel oxide, nickel sulfide, tungsten sulfide $WS_3$, alone or in mixture with nickel sulfide, cobalt thiomolybdate, molybdenum oxide $MoO_3$, in mixture with cobalt oxide, cobalt titanate, nickel tungstenate, and mixtures of these catalysts, with or without supports such as alumina, active carbon and the like, act satisfactorily as catalysts for the mode of operation A.

Catalysts for mode B of carrying out the process of the invention are selected from the metals of the above-mentioned groups of the periodic table. In view of their high activity, the metals of group VIII are preferred, i.e., nickel, cobalt, palladium, platinum and the other metals of this group active in catalytic hydrogenation. These catalysts may be used either singly or in mixture with each other, and either in the state in which they occur in nature and pulverized or prepared in active form according to methods well known in the art of hydrogenation of unsaturated organic compounds. Moreover, they may be used unsupported or on supports such as alumina silica gel, magnesium oxide, active carbon, diatomaceous earth and the like.

The production of the catalysts mentioned hereinbefore is conventional and described, for instance, by F. G. Ciapetta and C. T. Planck in "Catalysis," Volume I, Chapter 7, published by Ed. P. H. Emmett.

When a fixed layer of a catalyst is to be used, we have preferred an average grain size of the catalytic material of between one and three millimeters (mm.), so as to obtain, on the one hand, a maximum of active surface in a catalyst that can still be recovered comfortably. When the catalyst is used in suspension in the liquid reaction phase, we have used a very fine powder. However, again with a view to recovering the catalyst, we have used a pulverized catalyst not finer than 200 mesh.

More in detail, both modes A and B of the process of the invention may be carried out either discontinuously or continuously. The apparatus used for the discontinuous as well as the continuous process is conventional in the art, and, therefore, only a schematical representation of one of the different operative arrangements to carry out the process is given in the accompanying flow sheet.

The three reactants, i.e., the hydrocarbon material to be treated, the solvent, and gaseous hydrogen are preferably mixed at normal room temperature, but at elevated pressure, and the mixture is then heated in a preheater to an intermediate temperature between the normal and the reaction temperature.

The preheated mixture under pressure is then introduced into the reactor, which is preferably vertically disposed and of tubular, cylindrical shape.

The mixture may be introduced either at the bottom or at the top level of the reactor tube, and the final product is withdrawn at the opposite end.

When working discontinuously, an apparatus flow-sheet and reactor operational system can be used which is analogous to the conventional system used in the hydrogenation of fats and oils and described, for instance, by Groggins in "Unit Process in Organic Synthesis," 4th ed., page 488 ff., published by McGraw-Hill Book Co., New York, 1952, and by Shreve in "Chemical Process Industries" 2d ed., page 612, also published by McGraw-Hill Book Co., in 1956.

When working continuously, the catalyst may be suspended in the reaction mixture after the same has been introduced into the reactor vessel or tube, in the same manner as described for processes relative to fats and fatty alcohols, for instance by Groggins supra, and in "Ullman's Encyclopaedie der Technischen Chemie, 3d ed., Vol. 7, pages 445 ff., published by Urban A. Schwarzenberg, Munich-Berlin, Germany, in 1956.

The catalyst may also be used in fixed layers disposed in the interior of the reactor in such a manner that these layers are traversed by the flow of the reaction mixture through the reactor, either in upward or in downward direction.

If the final reaction product is to be withdrawn from the top end of the reactor tube in the gaseous phase, by decreasing pressure sufficiently so that the product evaporates from the solvent at the prevailing high temperature, while the solvent remains in the reactor, the flow of the reaction mixture must be in upward direction.

When using a fixed catalyst layer in the continuous working of the process, apparatus similar to that currently employed in the hydrogenation and hydrogen-desulfuration in the vapor phase can be utilized, which apparatus is described in "Petroleum Processing" II, 118 (November 1956). This apparatus may be also provided with means for recycling hydrogen.

When the solvent is to be circulated in the process, it can either be injected into the reactor space together with the other reactants and then again separated when leaving the apparatus, or it can be separately introduced into the reactor vessel or tube.

It is also possible to cause a circulation of the solvent in a closed cycle within the apparatus. In this case, the solvent is separated from the treated hydrocarbon product at the exit of the reactor vessel and recycled by admixture to fresh hydrocarbon starting material, either prior to or after pre-heating.

Circulation of the solvent in a closed cycle can be advantageously effected by means of a separator column forming an integral part of the reactor.

The reactor vessel or tube is heated in a conventional manner, but a system for temperature control is provided in order to avoid excessive temperature differences between the various zones of the reactor. A conventional cooling system is also used and described, for instance, in "High Pressure Technology," page 396 ff., published by McGraw-Hill Book Co.

Pressure is applied prior to submitting the reactant mixture, with or without solvent, to pre-heating, and is effected essentially by the pressure of the utilized hydrogen gas.

Instead of hydrogen, a catalytic reforming gas having a hydrogen content of about 80% by volume can also be used as well as any other hydrogen-containing gas.

The reactor vessel or tube is substantially filled with the reaction mixture in the liquid phase, with some hydrogen dissolved therein, when the reaction product is to be withdrawn from the reactor in the liquid phase. However, if the final product is to be withdrawn from the top of the reactor in the gaseous phase, the liquid phase fills almost the entire height of the tube, with only a relatively small volume left for the gaseous phase thereabove.

In this case the reactor vessel will, of course, have a slightly larger volume than the liquid reactant mixture. In this case, the partial pressure of hydrogen, which is always added in excess, is independent of the volume of the gaseous phase. In fact, hydrogen partial pressure is almost equal to the total pressure prevailing in the reactor, due to the generally reduced vapor pressure of the hydrocarbon material dissolved in the solvent.

For instance, iso-octane dissolved, as the hydrocarbon material to be treated, in a molar concentration of 50% in cetane, being the solvent, has at a temperature of 100° C. a vapor pressure of one-third atmosphere only (0.34 kg./cm.$^2$), which constitutes only a small fraction of the average of 20–80 atmospheres of hydrogen pressure used in mode A, and the about 5–20 and up to 50 atmospheres used in mode B of working the invention.

Consequently, the ratio between the volume of hydrocarbon material and the volume of solvent suffices completely to define the conditions in the reactor, the volume of the liquid phase being the sum of the aforesaid two volumes.

The volume of the reactor vessel can easily be dimensioned according to the various considerations stated hereinbefore. In the continuous process the desired rate of flow of the material must also be taken into account.

In order to achieve optimal results from the use of the liquid phase in the process of the invention, it is necessary to provide for an intimate contact between the phases present in the reactor, so that the speed with which the reaction takes place, is limited only by the reaction velocity between the reactants per se, and not by slower diffusion in the reaction medium.

The necessary intimate contact can be produced with the aid of mechanical agitation, for instance with a stirrer rotating at from 300 to 3000 revolutions per minute, or by the kinetic energy of the reactants due to the method by which they are introduced into the reaction zone. In the former case we use stirrers of the blade or turbine type. We have found that the velocity of the reaction increases with degree of agitation of the liquid phase, but rapidly reaches an asymptotic limit. We prefer to operate at a stirring speed which is the lowest still permitting a satisfactory approach to that limit value. In the latter case, mixing is effected as a consequence of the gas being circulated, or of the circulating liquid, or both.

A reactor provided with the necessary devices for effecting a mixing operation by the kinetic energy of the reactants is described by P. H. Groggins in "Unit Processes in Organic Synthesis," page 466 ff, published by McGraw-Hill Book Co., New York, in 1938.

At the end of the reaction, the purified product is easily separated from the solvent by any one of the known processes, such as fractionated distillation. The latter is easily carried out due to the large difference between the boiling points of the treated product and the solvent. This separation may be carried out either in the reactor itself or in a subsequently arranged separate plant. This plant may comprise the necessary apparatus for the removal of hydrogen sulfide, residual water and ammonia formed during the reaction, by absorption, adsorption or entraining in a suitable vehicle gas (stripping).

The above mentioned methods of separating the final product from the solvent by fractionated distillation, absorption or stripping are described in detail, for instance, by W. L. Nelson in "Petroleum Refining Engineering" (2d ed., 1941). Separation by adsorption is described by V. A. Kalichevsky and K. A. Kobe, supra, pages 222–223.

The resultant product from process mode A contains only a very low percentage of impurities compared with the initial hydrocarbon material. Thus, the sulfur content can be reduced from an initial 0.1% to 1% by weight and higher down to values of 0.01% and less, and even as low as 0.001%. The nitrogen content is decreased generally below 1 part per million (p.p.m.). The ultimately desired degree of purification (mode A) depends on the purposes for which the purified material is to be used subsequently. Thus, for catalytical reforming, the sulfur content should be below 0.0025% and the nitrogen content not higher than 1 p.p.m. For the purpose of subsequent catalytic saturation by hydrogenation, the sulfur content should be lower than 0.001%.

In carrying out mode A, the mixture of the hydrocarbon material and the solvent is treated with hydrogen at temperatures between 250° and 500° C., and preferably between 325 and 425° C., and at pressures between 10 and 250 atmospheres above normal and preferably between 20 and 80 atmospheres excess pressure, in the presence of a hydrogenation catalyst of the first group described above. The partial pressure of hydrogen during the entire reaction in the gaseous phase above the reaction mixture is maintained higher than 3 atmospheres above atmospheric pressure throughout the reaction. The volume of this gaseous phase above the liquid reaction mixture may be small, thereby permitting the above-mentioned reduction in the amount of hydrogen to be recycled through the process.

In carrying out mode B of the process according to the invention, either alone, or as the second step in the treatment of a crude hydrocarbon material having a high content of impurities, the latter content must have been reduced previously to the order of a few hundredths of one percent, in order to make the hydrocarbon material suitable for treatment by this mode B, or such hydrocarbon material must initially contain impurities only in amounts of that order.

The partial or total saturation of the unsaturated hydrocarbon material can then be achieved by subjecting the mixture of the latter material and a solvent of the type described above, to the action of hydrogen at temperatures between 100° and 250° C., and preferably between 150° and 200° C., and under pressures below 50 atmospheres above normal and preferably ranging from 5 to 20 atmospheres excess pressure, in the presence of a catalyst chosen from those of the second group described hereinbefore, i.e., from a metal or metals of the eighth group of the periodic table.

In carrying out mode B of the invention, we have found that the rate of conversion of an unsaturated hydrocarbon to a saturated hydrocarbon dissolved in the liquid phase increases progressively with the quantity of the catalyst used in proportion to a given amount of hydrocarbon, up to an asymptotic limit amount of catalyst.

It is, therefore, desirable to employ a lesser amount of catalyst permitting to achieve a rate of conversion which is still sufficiently close to that limit value to permit economic operation of the process.

By suitably selecting the ratio of the catalyst employed to the feeding rate of unsaturated hydrocarbon material, it is possible to obtain a determined rate of saturation up to 100% of the total amount of unsaturated compounds originally contained in the treated material.

The separation of the final, saturated reaction products can be carried out in the same manner as described above under mode A.

The invention is further illustrated by a number of examples given below which are, however, not meant to be limitative in any way of the scope of the invention.

These examples relate respectively to hydrorefinement (mode A) and saturation (mode B). The solvents used in all examples according to mode A are such that the adsorption coefficient of the reactant of each example, i.e. the sulfur derivatives and other impurities, is at least 30 times more than the adsorption coefficient of the remaining constituents of the mixture. The solvents used in examples according to mode B all have an adsorption coefficient substantially lower than 0.1 as compared with an adsorption coefficient of the unsaturated hydrocarbon starting material of at least 500, i.e. at least 5000 times more.

In the following examples, the amounts of liquids and gaseous hydrogen are given in parts by volume, and the amounts of catalyst used in parts by weight. The relationship between parts by volume and parts by weight is that of milliliters to grams. All percentages are given by weight.

Example I 125 parts by volume of a crude coke oven light oil fraction having an initial distillation point of 85° C. and a final distillation point of 190° C., and being an opaque liquid of dark brown color, containing about 0.25% of sulfur and other impurities, are mixed in an autoclave with an equal volume of cetane having a boiling point of 287.5° C. The pressure over the mixture due to the introduction of hydrogen is raised up to 62 kilograms per square centimeter (kg./cm.$^2$); when the mixture is transferred to a reactor and heated to 350° C. in a reactor vessel of the above mentioned type for discontinuous working, and agitated therein with a stirrer having a speed of 1600 revolutions per minute. The partial pressure of hydrogen in the gaseous phase above the liquid in the reactor is 15.5 kg./cm.$^2$. One part (by weight) of pulverized cobalt thio-molybdate having a grain size of 200 mesh fine is then suspended in the mixture. The treatment is terminated after about one hour, whereupon the reaction product is removed from the autoclave and separated by fractionation under normal pressure, the latter step yields per liter of crude fraction treated 0.982 liter of a fraction obtained between 83° and 185° C., which is a clear refined product of pale yellowish color having a sulfur content below 0.01%.

Example I–A

For the sake of comparison, an equal amount of the same crude benzene as used in Example I is treated under the same conditions of temperature and pressure (350° C. and 60 atmospheres) with the same amount of the identical catalyst, but without the use of solvent, i.e. in the vapor phase. After a treatment with hydrogen in the same amount and partial pressure as in Example I, also for one hour, a reaction product is obtained, the properties of which differ but little from those of the starting material with regard to its color as well as its sulfur content which is still 0.22%.

Example II 250 parts of a light naphtha having the distillation points of 40° C. (initial) and 130° C. (final), a specific gravity of $d_4^{15}=0.705$, and a refraction index $n_d^{20}=1.3960$, and furthermore a sulfur content of 0.05% is mixed with 375 parts of a solvent consisting of dodecylcyclohexane having a boiling point of 330° C. A major portion of this naphtha consists of aliphatic compounds having 5 carbon atoms per molecule. The pressure over the mixture is raised to 30 kg./cm.$^2$ due to introducing hydrogen and heating the mixture to 325° C. in the reactor. 2 parts by weight of a pulverized catalyst consisting of sulfurized cobalt molybdate having an average grain size of 180 mesh fine, are suspended in the mixture in the reactor. The partial pressure of hydrogen in the gaseous phase above the liquid mixture is about 6 kg./cm.$^2$. Hydrogenation takes place for 30 minutes under stirring at 1200 r.p.m. The final reaction product is separated from the mixture by fractionated distillation, which yields one liter per liter of initially introduced hydrocarbon material, constituting the fraction between 30° C. and 144° C. and being a naphtha having a sulfur content below 0.001%. The hydrogenation refinement according to the invention has thus permitted the removal of 98% of the original sulfur content from the treated material.

Example II–A

Example II is repeated, but dodecyl-decahydronaphthalene having a boiling point of 412° C. is used as the solvent. The results are the same as in the preceding example.

Example III 250 parts of a light naphtha having an initial distillation point of 60° C. and a final point of 130° C., a specific gravity of $d_4^{15}=0.763$, a refraction index $n_d^{20}=1.4260$, and a sulfur content of 0.20%, are mixed with 375 parts of the same solvent as in the previous example. Pressure over the mixture is raised to 90 kg./cm.$^2$ due to the introduction of hydrogen, and heating of the mixture to 350° C. 2 parts by weight of a catalyst consisting of a mixture of molybdenum oxides and cobalt oxides on an alumina support, and prepared according to Ciapetta and Planck, supra, are suspended in the mixture. The mixture is agitated by stirring at 1300 r.p.m. for about one hour. The reaction is then terminated and the final product is separated by fractionated distillation, which yields one liter per liter of initially charged crude naphtha of a fraction between 53° C. and 135° C., being a purified naphtha having a sulfur content below 0.001%. The treatment thus succeeded in removing more than 99.5% of the initial sulfur content of the hydrocarbon material.

Example IV 125 parts of a naphtha having an initial distillation point of 130° C. and a final point of 215° C., a specific gravity of $d_4^{15}=0.790$, a refraction index $n_d^{20}=1.4355$, and a sulfur content of 0.62%, is mixed with an equal volume of cetane, having a boiling point of 287.8° C. A major portion of this naphtha consists of aliphatic compounds having 13 carbon atoms per molecule. Pressure is raised to 50 kg./cm.$^2$ due to the introduction of hydrogen and heating of mixture to 350° C. in the reactor. One part by weight of the same catalyst as used in Example I is then suspended in the mixture. The contents of the reactor are then mixed intimately by stirring at 1700 r.p.m. until the reaction is terminated which is the case after about 45 minutes. The resulting reaction product is separated by fractionated distillation, and, a fraction between 118° C. and 228° C. is obtained in amounts of 125 parts by volume. This fraction consists of a purified naphtha having a sulfur content of less than 0.001%, 99.8% of the original sulfur content thus having been removed by the treatment according to mode A of the invention.

Example V

A naphtha having an initial distillation point of 130° C. and a final point of 215° C., a specific gravity of $d_4^{15}=0.793$, a refraction index of $n_d^{20}=1.4420$, a sulfur content of 0.39% and a nitrogen content of about 6 parts per million (p.p.m.) is introduced in a continuous stream at a flow rate of 125 parts per hour in mixture with an equal amount by volume per hour of paraffin oil (liquid petrolatum, Merck Index of Chemicals and Drugs, 6th Edition, 1952, page 733) having an initial boiling point of 300° C. and a final point of 400° C., and a solidifying point of 1.1° C., and 12,500 parts (by volume at normal pressure and temperature) per hour of hydrogen into a tubular reactor, the mixture is heated therein to a temperature of 400° C. under a pressure of 90 kg./cm.², and caused to traverse a stationary layer of a catalyst consisting of 5 parts by weight of chromium oxide on a support of active carbon. The reaction product leaves the reactor through the top end thereof in the liquid phase, and separated from the hydrogen which is recycled into the process. The solvent is then separated from the resulting purified naphtha by fractionated distillation. The final product has a sulfur content of 0.005%, the initial sulfur content having thus been reduced by 98.7%. The nitrogen content has been reduced to below 1 p.p.m.

*Example V-A*

For the sake of comparison a naphtha of the same characteristic as in the preceding example, is treated conventionally with hydrogen gas at a temperature of 400° C. and a pressure of 50 kg./cm.² in the presence of a cobalt molybdate catalyst deposited in alumina and disposed in a fixed layer in the reactor, in the gaseous phase. The reaction is continued until the starting material is sufficiently purified to have the same final sulfur content of 0.005% as in Example V. The reaction velocity expressed in volumes of end product per volume of catalyst and per hour is only 4 when working in the gaseous phase, as against 15 when working in the liquid phase according to the invention, i.e. as in Example V.

*Example VI*

The same starting material as used in Example V is introduced in a continuous process at a flow rate of 125 parts by volume per hour in mixture with 12,500 liters (at normal temperature and pressure) per hour of hydrogen into a tubular reactor after preheating of the mixture to 370° C. under a pressure of 90 kg./cm.². The gaseous mixture is then caused to pass under that pressure through a reactor chamber containing the same type of paraffin oil as used in Example V, in which 2 parts by weight of tungsten sulphide $WS_2$, pulverized to an average grain size of 200 mesh fine, have been suspended as a catalyst. In order to assure a ratio of the naphtha volume to the volume of the solvent in the liquid phase in the order of 1:1 under the given rates of flow, the aforesaid volume of paraffin oil is held in a tubular reactor chamber being so dimensioned as to hold the total volume of about 10 parts of the liquid phase, the solvent amounting to about 40% volume thereof. The contents of the reaction chamber are stirred by means of the kinetic energy of the reactants. The reaction product is withdrawn from the tubular reactor chamber at its upper outlet in the vapor phase due to release of pressure, and is then freed by fractionated distillation from entrained traces of the solvent. The resultant naphtha has a sulfur content of only 0.002%, which corresponds to an elimination of 99.5% of the initially contained sulfur. The nitrogen content of the starting material is reduced to below 1 p.p.m.

*Example VII*

A naphtha of the same type as treated in Examples V and VI is introduced at a flow rate of 120 liters per hour and in mixture with 80 liters per hour of dodecyl cyclohexane and 12,000 liters per hour (calculated under normal pressure and temperature) of hydrogen into a tubular reactor after having been heated previously to 400° C. under a pressure of 90 kg./cm.². In the tubular reactor the mixture is caused to traverse a catalyst disposed in the reactor in a fixed layer, and consisting of 4 kg. of molybdenum oxide and cobalt oxide on an alumina support. The reaction product leaves the upper level of the solvent mixture as a vapor in mixture with the excessive hydrogen; it is separated from the latter by condensation, the hydrogen is recycled, and the reaction product is separated from entrained solvent by fractionated distillation, whereby a naphtha having a sulfur content of 0.005% is obtained. The treatment has thus led to a reduction of the initial sulfur content of the naphtha by 98.7%, and to a reduction of the nitrogen content to below 1 p.p.m.

*Example VIII*

The same starting material as used in Example VI is introduced in a continuous process at a flow rate of 125 liters per hour in mixture with 12,500 liters per hour of hydrogen into a tubular reactor after previously heating to 370° C. under a pressure of 90 kg./cm.². The gaseous mixture is then caused to pass upwardly through a vertically disposed reactor tube being substantially filled with the same type of paraffin oil as used in Example V, in which 3 kg. of a mixed catalyst consisting of tungsten sulfide, $WS_2$ and nickel sulfide $NiS$, pulverized to an average grain size of 190 mesh fine, have been suspended. In order to assure a ratio of the naphtha volume to the volume of the solvent in the liquid phase in the order of 1:1, the aforesaid tubular reactor is so dimensioned as to hold about 15 liters of the liquid phase, about 40% of which or about 6 liters are occupied by the solvent. The contents of the reactor tube are agitated during the reaction by means of the own kinetic energy of the introduced mixture as described by Groggins, supra. The reaction product is withdrawn from the tubular reactor chamber at its upper outlet in the vapor phase and is condensed and the hydrogen recycled while the product is then freed by fractionated distillation from entrained traces of the solvent. The resultant naphtha fractionated between 120° C. and 230° C. has a sulfur content of only 0.002%, which corresponds to an elimination of 99.5% of the initially contained sulfur. The nitrogen content of the naphtha has been reduced to below 1 p.p.m.

*Example VIII-A*

The preceding example is repeated, but instead of the paraffin oil used therein, a paraffin wax having a melting point of 51° C. and an average molecular weight of 375 is used as the solvent. The results of this example are the same as of Example VIII.

*Example VIII-B*

Example VIII is repeated, but a petroleum distillation fraction having an initial boiling point of 360° C. and a final point of 425° C. is used as the solvent. The results are the same as those of Example VIII.

*Example IX*

125 parts of a crude coke oven light oil having an initial distillation point of 68° C. and a final point of 190° C., a specific gravity of $d_4^{15}=0.878$ and a sulfur content of 0.26% are mixed with an equal volume of cetane, having a boiling point of 287.8° C. Pressure over the mixture is raised to 50 kg./cm.² due to the introduction of hydrogen and heating of the contents to 350° C. in the reactor. One part by weight of a catalyst consisting of cobalt thiomolybdate is pulverized to an average grain size of 190 mesh fine and suspended in the mixture. The contents of the reactor are then mixed intimately by stirring at 1800 r.p.m. until the reaction is terminated which is the case after about 45 minutes. The resulting reaction product is separated by fractionated distillation, and, a fraction between 60° C. and 188° C. is obtained in amounts of 124.4 parts by volume. This fraction consists of a purified product having a sulfur content not exceeding 0.01%, which corresponds to an elimination of 96% of the sulfur content in the crude benzene.

*Example X*

125 parts of a crude coke-oven light oil having an initial distillation point of 85° C. and a final point of 190° C., a specific gravity of $d_4^{15}=0.874$ and a sulfur content of 0.23% is mixed in an autoclave with an equal volume of paraffin oil of the type used in Example V. Hydrogen is then introduced in sufficient amounts to raise the pressure in the autoclave to 50 kg./cm.², when the contents of the autoclave are heated to 350° C. One part by weight of a catalyst consisting of cobalt thiomolybdate pulverized to an average grain size of 200 mesh fine is suspended in the mixture, which is then mixed intimately by stirring at 2000 r.p.m. The reaction is terminated after about 45 minutes. The resulting reaction product is separated by fractionated distillation, and, a fraction between 81° C. and 189° C. is obtained in amounts of 124 parts by volume. This fraction consists of a purified product having a sulfur content not exceeding 0.01%, which corresponds to an elimination of 95.6% of the initial sulfur content in the crude benzene.

*Example X–A*

Example X is repeated, but using instead of paraffin oil a solvent consisting of a heavy mineral oil fraction obtained by the fractionated distillation of petroleum between the temperature limits of 350° and 425° C. This fraction is first filled in the autoclave, the catalyst is admixed, and a preliminary treatment with hydrogen is carried out prior to introducing the crude benzene into the solvent. By this preliminary step any impurities present in the solvent are removed. The results of this example are the same as those of Example X.

*Example XI*

The same starting material as used in Example X is introduced in a continuous process at a flow rate of 125 parts by volume per hour in mixture with 15,000 liters (at normal temperature and pressure) per hour of hydrogen into a tubular reactor after being heated to 350° C. under a pressure of 50 kg./cm.² The mixture is then introduced through the bottom inlet passage of the reactor containing the same type of paraffin oil as used in Example V and a fixed layer of 6 parts by weight catalyst consisting of cobalt molybdate deposited on alumina. In order to assure a ratio of the naphtha volume to the volume of the solvent in the liquid phase in the order of 3:4, the volume of the tubular reactor is so dimensioned that it can hold the total volume of the liquid phase amounting to about 7.5 parts by volume, of which the solvent constitutes about 20%. The contents of the reaction chamber are agitated during the reaction by means of kinetic energy of the reactants. The reaction product is withdrawn from this reactor chamber at its upper end in the vapor phase and is then condensed and freed by fractionated distillation from entrained traces of the solvent. The relatively small amounts of hydrogen separated during the condensation are recycled. The resultant naphtha has a sulfur content of only 0.008%, which corresponds to an elimination of 96.6% of the initially contained sulfur.

*Example XII*

350 parts of a crude coke oven light oil described in Example X are mixed in an autoclave with 150 parts of dodecyl benzene having a boiling point of 331° C. Hydrogen is then introduced in sufficient amounts to raise the pressure in the autoclave to 50 kg./cm.² when the mixture is heated to 325° C. 3 parts by weight of a catalyst consisting of cobalt thiomolybdate pulverized to an average grain size of 190 mesh fine are suspended in the mixture, and the contents of the autoclave are then mixed intimately by stirring at 1900 r.p.m. until the reaction is terminated which is the case after about 1 hour. During the reaction, the partial hydrogen pressure in the gaseous phase above the mixture is about 18 kg./cm.² The resulting reaction product is separated by fractionated distillation, and, a fraction between 82° C. and 190° C. is obtained in amounts of 347 parts by volume. This fraction consists of a purified product having a sulfur content not exceeding 0.04%, which corresponds to an elimination of 82.5% of the sulfur content in the crude benzene.

*Example XII–A*

Example XII is repeated with biphenyl having a boiling point of 255° C. as the solvent, instead of dodecyl benzene. The results of this example are the same as in Example XII.

*Example XIII*

62.5 parts of a purified benzene having a refraction index of $n_d^{20}=1.5011$, a specific gravity of $d_4^{20}=0.879$, and a sulfur content below 0.001%, are mixed in an autoclave with 187.5 parts of the same type of paraffin oil as used in Example V. Hydrogen is then introduced into the mixture in sufficient amounts to raise the pressure in the autoclave to 12 atmospheres when the temperature of the contents is raised to 195° C. One part by weight of Raney nickel prepared as described by Ciapetta and Planck, supra, with an average grain size of 200 mesh fine, is suspended in the mixture, which is then stirred at a speed of 2500 r.pm. The reaction is terminated after about 15 minutes. The resulting product, separated conventionally from the reacted mixture, has a boiling point of 80.5° C. and consists of a completely saturated cyclohexane, which corresponds practically to a 100% yield based on the initial amount of benzene.

*Example XIV*

125 parts of pure xylenes having a refraction index of $n_d^{20}=1.5003$, a specific gravity of $d_4^{20}=0.871$, and a sulfur content below 0.001%, are mixed in an autoclave with 125 parts of dodecyl cyclohexane having a boiling point of 331° C. Hydrogen is then introduced into the mixture in sufficient amounts to raise the pressure in the autoclave to 8 atmospheres. When the temperature of the contents is raised to 150° C. and 4 parts by weight of nickel deposited on diatomaceous earth prepared as described by Ciapetta and Planck, supra, with an average grain size of 200 mesh fine, are suspended in the mixture, which is then stirred at a speed of 1800 r.p.m. The reaction is terminated after about 30 minutes. The resulting product, separated conventionally from the reacted mixture, has a boiling point of 119° C. to 129° C. and consists of a completely saturated dimethyl cyclohexane, which corresponds practically to a 100% yield based on the initial amount of benzene.

*Example XV*

Purified iso-octene having a specific gravity of $$d_4^{20}=0.715$$

and a boiling range between 111° C. and 125° C., is introduced in a continuous process at a flow rate of 125 liters per hour in mixture with 25,000 liters (normal conditions) per hour of hydrogen into a tubular reactor after being heated to 195° C. and brought to a pressure of 10 kg./cm.² The resulting mixture is then caused to pass through the reactor tube containing parffiin oil of the type used in Example V in which 3 kg. of a catalyst consisting of nickel deposited on diatomaceous earth and prepared as described by Ciapetta and Planck, supra, have been suspended. In order to assure a ratio of the iso-octene volume to the volume of the solvent in the liquid phase in the order of 1:2 under the given rates of flow, the aforesaid tubular reactor is of such capacity as to hold a total liquid phase volume of 20 liters, of which about 42.5% are constituted by the volume of the solvent. The contents of the reaction tube are stirred by means of the kinetic energy of the introduced mixture. The reaction product is withdrawn from the tubular reactor chamber at its top end in the vapor phase and is then condensed and freed by fractionated distillation from entrained traces of the solvent. The hydrogen set free during condensation is recycled. The resultant completely saturated iso-octane is obtained in amounts which correspond to a yield of 96% based on the initially introduced iso-octene. Iso-octene has an adsorption coefficient on the catalyst of about 700 as compared with far less than 0.1 for the paraffin oil.

*Example XVI*

125 parts of a pure toluene having a refraction index of $n_d^{20}=1.4969$, a specific gravity of $d_4^{20}=0.867$, and a sulfur content below 0.001%, are mixed in an autoclave with 125 parts of cetane having a boiling point of 287.8° C. (normal pressure). Hydrogen is then introduced into the mixture in sufficient amounts to raise the pressure in the autoclave to 15 atmospheres when the temperature of the contents is raised to 130° C. and one part by weight of a catalyst consisting of plantinum deposited at the rate of 1% by weight on active carbon and prepared as described by Ciapetta and Planck, supra, with an average grain size of 200 mesh fine, is suspended in the mixture, which is then stirred at a speed of 1700 r.p.m. The reaction is terminated after about 60 minutes. The resulting product, separated conventionally from the reacted mixture, has a boiling point of 100.5° C. and consists of completely saturated methyl cyclohexane, which corresponds practically to a 100% yield based on the initial amount of benzene.

*Example XVII*

83 parts of a purified cyclohexene having a refraction index of $n_d^{20}=1.4452$, a specific gravity of $d_4^{20}=0.810$, and a sulfur content below 0.001%, are mixed in an autoclave with 166 parts of dicyclohexyl having a boiling point of 236° C. (normal conditions). Hydrogen is then introduced into the mixture in sufficient amounts to raise the pressure in the autoclave to 15 atmospheres, when the temperature of the contents is raised to 200° C. and two parts by weight of nickel deposited on an alumina support and prepared as described by Ciapetta and Planck, supra, with an average grain size of 190 mesh fine, are suspended in the mixture, which is then stirred at a speed of 2200 r.p.m. The reaction is terminated after about 35 minutes. The resulting product, separated conventionally from the reacted mixture, has a boiling point of 100.5° C. and consists of a completely saturated cyclohexane, which corresponds practically to a 100% yield based on the initial amount of benzene. Cyclohexene has an adsorption coefficient on the catalyst of about 550 as compared with an adsorption coefficient of dicyclohexyl substantially lower than 0.1.

*Example XVIII*

A hydrocarbonaceous fraction obtained from distillation of a crude petroleum and having an initial distillation point of 150° C. and a final point of 200° C. is constituted by 77.5% by volume of saturated hydrocarbons and by 22.5% by volume of aromatic hydrocarbons having a sulfur content of 0.07%. This starting material is successively (a) hydrogen refined and then (b) hydrogenated for the purpose of removing the unsaturation, according to the process of the invention. In the first phase of the operation, a tubular reactor is charged continuously with a stream of a mixture of 125 liters per hour of the starting material and 10,000 liters by volume per hour (taken under normal conditions) of hydrogen, preheated to 375° C. under a pressure of 40 kg./cm.² and then introduced at the bottom of the tubular catalytic reaction chamber which contains a fixed layer of 6 kg. of a catalyst consisting of a mixture of molybdenum oxide $MoO_3$ and cobalt oxide CoO deposited on an alumina support and filled with a heavy mineral oil obtained by the fractionated distillation of petroleum as a fraction between 350° and 425° C., as the solvent. The tubular reaction chamber is so dimensioned as to hold about 7.5 liters of the total liquid phase volume, of which about 17% by volume are contributed by the solvent, thereby insuring during the reaction and under the given conditions of flow, a ratio between the volume of the starting material and the solvent in the order of 1:1. The reaction product is then withdrawn from the upper end of the reaction chamber in the vapor phase, condensed and separated from hydrogen and traces of hydrogen sulfide which it contains by a known method, for instance, as described in Kalichevsky supra. The final product of the first stage of operation then constitutes a refined hydrocarbon fraction containing 78.5% by volume of saturated hydrocarbons and 21.5% by volume of aromatic hydrocarbons, and has a sulfur content below 0.001% by weight. In the second stage of the process according to the invention, the last mentioned refined hydrocarbon fraction is then continuously introduced into a second reactor at a rate of flow of 125 liters per hour and in mixture with 10,000 liters (by volume at normal temperature and pressure) of hydrogen. The reactor is provided with a turbo-agitator and contains suspended in the same type of a solvent that was used in the first phase, 4 kg. of a pulverulent catalyst having an average grain size of 180 mesh fine and consisting of nickel metal deposited on kieselguhr. The reaction medium is maintained at a temperature of 200° C. and under a pressure of 20 atmospheres. In view of the quantity of solvent present in the latter which amounts to about 50% thereof, the liquid reaction medium occupies a total volume of 30 liters, and the hydrocarbon fraction is present in the solvent during the reaction in the liquid phase, in a ratio of 1:1, taking into account the given rates of flow. The catalyst and the solvent are separated from the final product as described in the previous examples. The final hydrocarbon fraction has a content of aromatic hydrocarbons of only about 0.9%, which constitutes a saturation rate of the originally present aromatic hydrocarbons of 95%.

*Example XVIII-A*

The previous example is repeated, using the same type of paraffin oil as in Example V as the solvent, instead of the heavy mineral oil. The results are the same as in Example XVIII.

*Examples XIX-XXII*

The following examples comprise a series of four comparative tests illustrating how the rate of conversion of the unsaturated portion of a hydrocarbon material depends on the ratio of the amount of the latter to the amount of catalyst used in carrying out mode B of operating the process of the invention. In each of the following four examples, a given volume of the same olefinic hydrocarbon fraction having a boiling range between 100° and 150° C. and an iodine number of 152, as well as a sulfur content of 0.98% is introduced per hour in mixture with 110 times that given volume of hydrogen gas (the hydrogen volume being calculated at normal temperature and pressure) after preheating to 350° C. and under a pressure of 35 kg./cm.² into the lower end of a reactor containing in suspension in a paraffin wax having a melting point of 71° C. and an average molecular weight of 545, one kilogram of pulverized cobalt molybdate. The reaction product which is withdrawn from the reactor at the top end of the latter, is freed by fractionated distillation from traces of the solvent, and then analyzed to determine the remaining sulfur content and the rate at which the olefinic portion of the starting material has been saturated.

The results are given below in tabulated form:

| Example No. | Liters of hydrocarbon per hour per kilogram of catalyst | Percent desulfurization | Percent saturation |
| --- | --- | --- | --- |
| XIX | 250 | 80 | 26 |
| XX | 125 | 90 | 51 |
| XXI | 62.5 | 97 | 77 |
| XXII | 40 | 99.3 | 95 |

The process according to our invention offers a number of important advantages over those hitherto used in the art:

(1) In mode A it is possible to obtain reaction velocities which are surprisingly much higher than those attainable with the known processes carried out in the gaseous phase. Depending on the nature of the hydrocarbon material being treated, and the operating conditions chosen, the reaction velocities vary between 20 and 200 parts of volume of liquid product treated per each part by volume of the catalyst and per hour, which velocities are from 20 to 200 times as high as those attained in the known processes.

(2) The amounts of hydrogen that must be recycled during the process are considerably reduced, for instance, to amounts of 50 to 250 liters (taken under normal conditions of pressure and temperature) per each liter of treated product, compared with from 250 to 1000 liters (normal conditions assumed) in the presently used processes. The quantities of hydrogen to be recycled in the process according to the invention thus amount to only 15 to 20% of those to be recycled in the known processes.

(3) In fact, in order to maintain during the reaction a sufficient partial pressure of hydrogen (generally above 1 atmosphere up to 20 atmospheres and higher), it is sufficient to operate, in the case of the liquid phase employed in the process according to the invention with a relatively small volume of hydrogen, taking into account the reduced volume of the vapor phase. Consequently, in order to treat a given volume of hydrocarbon materials, a reactor of much smaller dimensions can be used in the process according to the invention as compared with the known processes.

(4) The process is simplified by eliminating entirely the preliminary polymerization treatment as well as the usual rapid deactivation of the catalyst employed. (The aforesaid polymerization treatment is particularly necessary according to art processes when treating crude coke oven light oils.)

(5) It is possible to specifically and selectively hydrogenate the impurities in the hydrocarbon material alone without substantially saturating the unsaturated substances, and in particular the aromatic hydrocarbons contained in the treated material. This feature of the process according to the invention also permits to equally avoid an undesired cracking of the material.

(6) Undesirable secondary reactions liable to occur during the conventional processes are largely eliminated in the process according to our invention. For example, the hydrogenation of benzene in the vapor phase leads to a secondary reaction, which becomes noticeable at 100° C. and more pronounced, the higher the temperature employed, whereby methane is formed in parallel with the reaction leading to the desired formation of cyclohexane. In contrast thereto, the liquid phase process according to our invention leads even at higher reaction temperatures only to the formation of cyclohexane. This advantageous feature of limiting secondary reactions contributes in turn to a longer lifetime of the catalysts used, by avoiding their becoming poisoned by the byproducts of these secondary reactions.

(7) More particularly in mode B of operating the process according to the invention, it becomes possible to treat in the liquid phase those hydrocarbons which would normally be in the gaseous phase under the conditions of temperature and pressure required for effecting hydrogenation of unsaturated substances in the material being treated.

(8) The reduction of the partial vapor pressures of the hydrocarbon material being treated, due to its treatment in the liquid dissolved state, permits, when all other conditions are assumed to be equal, to use much lower pressures; thus, for instance, benzene which shows normally a vapor pressure of 14 atmospheres at a temperature of 200° C., only has one of four atmospheres at the same temperature, when dissolved in a molar concentration of 25% in cetane $C_{16}H_{20}$, which is one of the preferred solvents used in the process according to the invention. Hydrogenation of the benzene contained dissolved in the liquid cetane phase can, therefore, be carried out at a pressure of, for instance, only 5 atmospheres above normal. The same results are achieved when using any other solvent according to the invention.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What we claim is:

1. A process for the liquid phase catalytic hydrogenation treatment of a hydrocarbon starting material comprising the steps of admixing a hydrocarbon material selected from the group consisting of crude impure hydrocarbon fractions, unsaturated light hydrocarbon mixtures, and mixtures of unsaturated and saturated light hydrocarbons, said material having as an average two to about fourteen carbon atoms per molecule and a molecular weight of 25 to 200, with an organic hydrocarbon solvent having an average number of carbon atoms per molecule higher than that of said hydrocarbon starting material and which is inert with regard to said material and has a critical point substantially higher than the maximum pressure and temperature applied during the subsequent hydrogenation step; subjecting the resultant mixture in the liquid phase to pressures and temperatures at which said hydrocarbon material would be in the gaseous state in the absence of solvent and to the action of hydrogen in the presence of a catalyst conventionally used for the hydrogenation treatment of hydrocarbons said pressures being above normal pressure up to about 100 atmospheres and said temperatures between 100° and 500° C.; and separating the resultant product from the solvent and excess hydrogen.

2. A process as described in claim 1, characterized in that the solvent has a lower adsorption co-efficient with regard to the catalyst than does the treated hydrocarbon material.

3. A process for the liquid phase catalytic hydrogenation refinement of a hydrocarbon starting material containing a total of more than 0.01% by weight of sulfur, nitrogen and oxygen as impurities, acting as poisons for metallic hydrogenation catalysts comprising the steps of admixing a hydrocarbon material selected from the group consisting of crude impure hydrocarbon fractions, unsaturated light hydrocarbon mixtures, and mixtures of unsaturated and saturated light hydrocarbons, said material having as an average two to about fourteen carbon atoms per molecule and a molecular weight of 25 to 200, with an organic hydrocarbon solvent having an average number of carbon atoms per molecule higher than that of said hydrocarbon starting material and which is inert with regard to said material and has a critical point substantially higher than the maximum pressure and temperature applied during the subsequent hydrogenation step; subjecting the resultant mixture in the liquid phase to pressures and temperatures at which said hydrocarbon material would be in the gaseous state in the absence of solvent and to the action of hydrogen in the presence of a catalyst selected from the group consisting of the oxides and sulfides of the metals of columns VI and VIII of the periodic table of Mendelyeev, which catalysts are conventionally used for the hydrogenation refinement of hydrocarbons, said catalysts being resistant to said poisons, said pressures being between 10 and 100 atmospheres above normal and said temperatures between 250° and 425° C.; and separating the resultant purified product from the solvent and excess hydrogen.

4. A process for the liquid phase catalytic hydrogenation refinement of a hydrocarbon starting material containing a total of more than 0.01% by weight of sulfur, nitrogen and oxygen as impurities, acting as poisons for metallic hydrogenation catalysts comprising the steps of admixing a hydrocarbon material selected from the group consisting of crude impure hydrocarbon fractions, unsaturated light hydrocarbon mixtures, and mixtures of unsaturated and saturated light hydrocarbons, said material having as an average two to about fourteen carbon atoms per molecule and a molecular weight of 25 to 200, with an organic hydrocarbon solvent having an average number of carbon atoms per molecule higher than that of said hydrocarbon starting material and which is inert with regard to said material and has a critical point substantially higher than the maximum pressure and temperature applied during the subsequent hydrogenation step; subjecting the resultant mixture in the liquid phase to pressures and temperatures at which said hydrocarbon material would be in the gaseous state in the absence of solvent and to the action of hydrogen in the presence of a catalyst conventionally used for the hydrogenation refinement of hydrocarbons, said catalyst being selected from the group consisting of the catalytically active components of the heavy metals of groups VI and VIII of the periodic table of Mendelyeev, which compounds are resistant to said poisons.

5. A process as described in claim 4, characterized in that the temperature of the catalytic hydrogenation step is chosen between 325 and 425° C., and the pressure during the same step between 20 and 80 atmospheres above normal.

6. A process for the partial or total saturation by liquid phase catalytic hydrogenation of an at least partly unsaturated hydrocarbon material, which material contains impurities such as sulfur, nitrogen and oxygen and the like only in amounts up to about 0.01%, comprising the steps of admixing a hydrocarbon material selected from the group consisting of crude impure hydrocarbon fractions, unsaturated light hydrocarbon mixtures, and mixtures of unsaturated and saturated light hydrocarbons, said material having as an average two to about fourteen carbon atoms per molecule and a molecular weight of 25 to 200, with an organic hydrocarbon solvent having an average number of carbon atoms per molecule higher than that of the hydrocarbon starting material and which is inert with regard to said material and has a critical point substantially higher than the maximum pressure and temperature applied during the subsequent hydrogenation step; subjecting the resultant mixture in the liquid phase to pressures and temperatures at which said hydrocarbon material would be in the gaseous state in the absence of solvent and to the action of hydrogen in the presence of a catalyst conventionally used for the hydrogenation saturation refinement of hydrocarbons, said catalyst being a finely distributed metal selected from the group consisting of the catalytically active heavy metals of groups VI and VIII of the periodic table of Mendelyeev, said pressures being above normal and below 50 atmospheres and said temperatures between 100° and 250° C.; and separating the resultant product, the unsaturated components of which have been at least partly saturated, from the solvent and from excess hydrogen.

7. A process for the purification and at least partial saturation, by liquid phase catalytic hydrogenation, of at least partly unsaturated hydrocarbon starting material, which material contains more than 0.01% by weight of impurities such as sulfur, nitrogen and oxygen, which impurities act as poisons for metallic hydrogenation catalysts, comprising, as stage A the steps of admixing a hydrocarbon material selected from the group consisting of crude impure hydrocarbon fractions, unsaturated light hydrocarbon mixtures, and mixtures of unsaturated and saturated light hydrocarbons, said material having as an average two to about fourteen carbon atoms per molecule and a molecular weight of 25 to 200, with an organic hydrocarbon solvent having an average number of carbon atoms per molecule higher than that of the hydrocarbon starting material and which is inert with regard to said material and has a critical point substantially higher than the maximum pressure and temperature applied during the subsequent hydrogenation step; subjecting the resultant mixture in the liquid phase to pressures and temperatures at which said hydrocarbon material would be in the gaseous state in the absence of solvent and to the action of hydrogen in the presence of a catalyst selected from the group consisting of the oxides and sulfides of the metals of columns VI and VIII of the periodic table of Mendelyeev, which catalysts are conventionally used for the hydrogenation refinement of hydrocarbons, said catalysts being resistant to said poisons, said pressures being between 10 and 100 atmospheres above normal and said temperatures between 250° and 425° C.; and separating the resultant purified product from the solvent and excess hydrogen; and, as stage B the steps of admixing the purified product from stage A with an organic hydrocarbon solvent having an average number of carbon atoms per molecule higher than that of said hydrocarbon starting material and which is inert with regard to said product and has a critical point substantially higher than the maximum pressure and temperature applied during the subsequent hydrogenation step; subjecting the resultant mixture under pressures and temperatures at which said hydrocarbon material is in the gaseous state in the absence of solvent to the action of hydrogen in the presence of a catalyst conventionally used for the hydrogenation saturation refinement of hydrocarbons, said catalyst being a finely distributed metal selected from the group consisting of catalytically active heavy metals of groups VI and VII of the periodic table of Mendelyeev, said last-mentioned pressures being above normal and below 50 atmospheres and said last-mentioned temperatures between 100° and 250° C.; and separating the resultant product, the unsaturated components of which have been at least partly saturated, from the solvent and from excess hydrogen.

8. In the catalytic hydrogenation of a hydrocarbon material selected from the group consisting of crude impure hydrocarbon fractions, unsaturated light hydrocarbon mixtures, and mixtures of unsaturated and saturated light hydrocarbons, said material having as an average two to about fourteen carbon atoms per molecule and a molecular weight of 25 to 200, the improvement which comprises dissolving said hydrocarbon material in an organic solvent having an average number of carbon atoms per molecule higher than that of said hydrocarbon material and having a critical temperature substantially higher than the temperature at which the catalytic hydrogenation is being carried out, said organic solvent being inert to the hydrocarbon material, and subjecting the solution of organic solvent and hydrocarbon material to reaction temperatures and pressures at which said hydrocarbon material would be in the gaseous stage in the absence of said organic solvent.

9. The step as described in claim 8, further characterized in that the catalytic hydrogenation is steered selectively toward (A) hydrogen refinement of the hydrocarbon material by exclusively hydrogenating the sulfur-, oxygen-, and nitrogen containing substances and similar impurities in the hydrocarbon material by using, in the liquid phase, a suitable catalyst which is resistant to the action of the aforesaid impurities and remains active during the refinement step, and (B) toward at least partial saturation of the unsaturated hydrocarbon fraction contained in the hydrocarbon material to be treated, by using, in the liquid phase, a suitable catalyst for this second purpose, which catalyst is usually more sensitive to the aforesaid impurities than the catalysts employed under (A).

References Cited in the file of this patent

UNITED STATES PATENTS

| | | |
|---|---|---|
| 2,740,751 | Haensel et al. | Apr. 3, 1956 |
| 2,768,936 | Anderson et al. | Oct. 30, 1956 |
| 2,801,208 | Horne et al. | July 30, 1957 |